United States Patent [19]

Asano et al.

[11] Patent Number: 4,811,834
[45] Date of Patent: Mar. 14, 1989

[54] MECHANICAL TRANSFER FEEDER

[75] Inventors: Koji Asano; Masao Okawa, both of Niihama, Japan

[73] Assignee: Sumitomo Heavy Industries, Ltd., Tokyo, Japan

[21] Appl. No.: 76,820

[22] Filed: Jul. 23, 1987

[30] Foreign Application Priority Data

Aug. 8, 1986 [JP] Japan .................. 61-186294

[51] Int. Cl.⁴ ............................. B65G 25/00
[52] U.S. Cl. .................... 198/621; 198/858; 414/750; 74/56
[58] Field of Search ............... 414/749–753; 198/621, 858, 859; 74/56, 57

[56] References Cited

U.S. PATENT DOCUMENTS

| | | | |
|---|---|---|---|
| 3,011,464 | 12/1961 | Danly et al. | 198/621 X |
| 3,422,657 | 1/1969 | Grombka et al. | |
| 3,430,782 | 3/1969 | Henkel | 414/750 |
| 3,865,253 | 2/1975 | Healy | 414/751 X |
| 3,907,098 | 9/1975 | Babbitt | 198/621 |
| 4,139,090 | 2/1979 | Nelsen | 198/621 |
| 4,256,218 | 3/1981 | Gerben et al. | |
| 4,674,624 | 6/1987 | Katoh | 198/621 |

Primary Examiner—Robert J. Spar
Assistant Examiner—Lyle Kimms
Attorney, Agent, or Firm—Armstrong, Nikaido Marmelstein & Kubovcik

[57] ABSTRACT

A transfer feeder for operating to successively transfer articles from a certain position to a next position by clamping, lifting, advancing, lowering and unclamping repeatedly articles with a pair of parallel feed bars. The transfer feeder is provided with a mechanism for driving the feed bars comprising a single cam shaft rotatably supported through a feeder box, clamping cams, a lifting cam and advancing cams carried on the cam shaft, cam levers cooperating with wherementioned cams for operating the feed bars supported by a special structure as to guide the feed bars to move in the above manner. This transfer feeder is advantageous in that the total weight of operating sections is reduced and the smooth operation can be ensured.

2 Claims, 3 Drawing Sheets

MECHANICAL TRANSFER FEEDER

BACKGROUND OF THE INVENTION

The present invention relates to a transfer feeder for taking hold of articles and transferring them back and forth, left and right or up and down and, more particularly, to a three-dimensional transfer feeder of mechanical type which is useful to utilize for taking the parts to be pressed into or out of a press machine.

Conventionally, a transfer feeder of this type has been arranged such that a pair of feed bars extending horizontally would hold work-pieces and transfer them in the directions of two or three dimensions and, as a driving mechanism for such feed bars, a combination of cams, hydraulic cylinders and gear mechanisms etc. is employed. Further, driving mechanisms for moving the feed bars up and down (a lift system), left and right (a clamp system), and back and forth (an advance system) are driven by at least more than two driving sources, and timing of those respective motions for the feed bars are determined by means of limit switches or the like.

The foregoing conventional mechanical transfer feeder necessitates a plurality of driving sources and, therefore, this feeder is complicated in structure and becomes unsuitable for high speed operation. In other words, in case of the conventional structure, for example, levers, links or gears and so on are complicatedly incorporated between driving cams and the feed bars, that is final operation members, so as to provide a large number of jointed portions therebetween. These jointed portions will come to play during the reciprocal movement of respective operation shafts connected to the feed bars, so that this play motions preclude that mechanism from smoothly driving. Due to many interposed members in mechanisms, acceleration generated upon running of the mechanisms leads each member to deform so that errors may occur in the feed bar actions with respect to the operational displacements of the cams. For these reasons, vibration will be happened on the feed bars and in the operating system. Furthermore the feeder must cover the working functions having three dimensions, and this causes a problem to the feeder, resulting in heavy weight for each of the operating systems (the clamp, lift, advance systems).

SUMMARY OF THE INVENTION

Accordingly, it is an object of the present invention to provide a mechanical transfer feeder employing a driving source composed of a single cam shaft, thereby being reduced in weight, and also simplified in structure so that accurate and sooth operation can be ensured.

In order to achieve the above object, according to the present invention there is provided a mechanical transfer feeder comprising a pair of substantially parallel feed bars, at least one pair of opposed jaws each being provided on each bar, a mechanism incorporated in a feeder box disposed above the bars for moving the bars in three directions, each direction being substantially perpendicular to the other two directions, to effect cyclic movement of the bars such that each pair of jaws act to clamp, lift, advance, lower and unclamp an article and return to the original position, thereby successively transferring articles from a first position to a second position, the mechanism including a cam shaft rotatably supported in the feeder box and carrying a pair first cams a pair of second cams and a pair of third cams, means driving the cam shaft, a pair of first cam levers having at their one end cam followers cooperating with the first cams and carrying at their other end a rod in parallel with the cam shaft, a pair of bearing members fitted around both ends of the rod so as to be allowed to move axially with respect to the rod, a pair of lift guides each being connected at its upper end to each bearing member and carrying at its lower end a bearing for slidably supporting each bar, a pair of lift guide carriers each being slidably supported in the feeder box to move in a direction parallel with the cam shaft and supporting each lift guide to be vertically slidable therein, a pair of second cam levers each operating the lift guide carrier in response to operation of the second cam, a pair of third cam levers each having at its one end a cam follower cooperating with the third cam and being connected at its other end to each bar through a link.

The present invention will fully be understood from the following description of the preferred embodiments with reference to the accompanying drawings.

DESCRIPTION OF THE PREFERRED EMBODIMENTS

Figure 1:
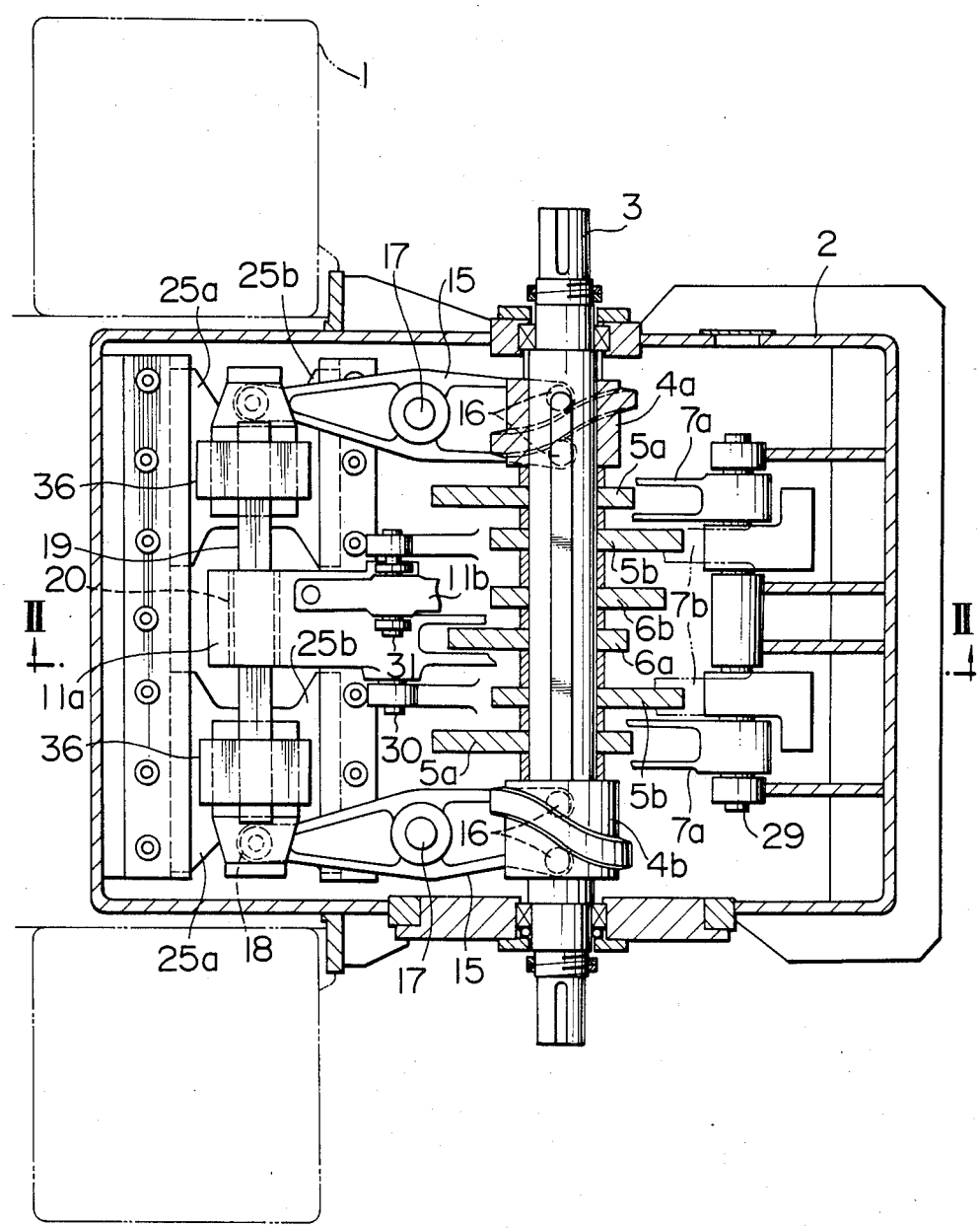
FIG. 1 is a transverse cross-sectional plane view taken along a line I—I in FIG. 2, showing an embodiment of a mechanical transfer feeder according to the present invention.
Figure 2:
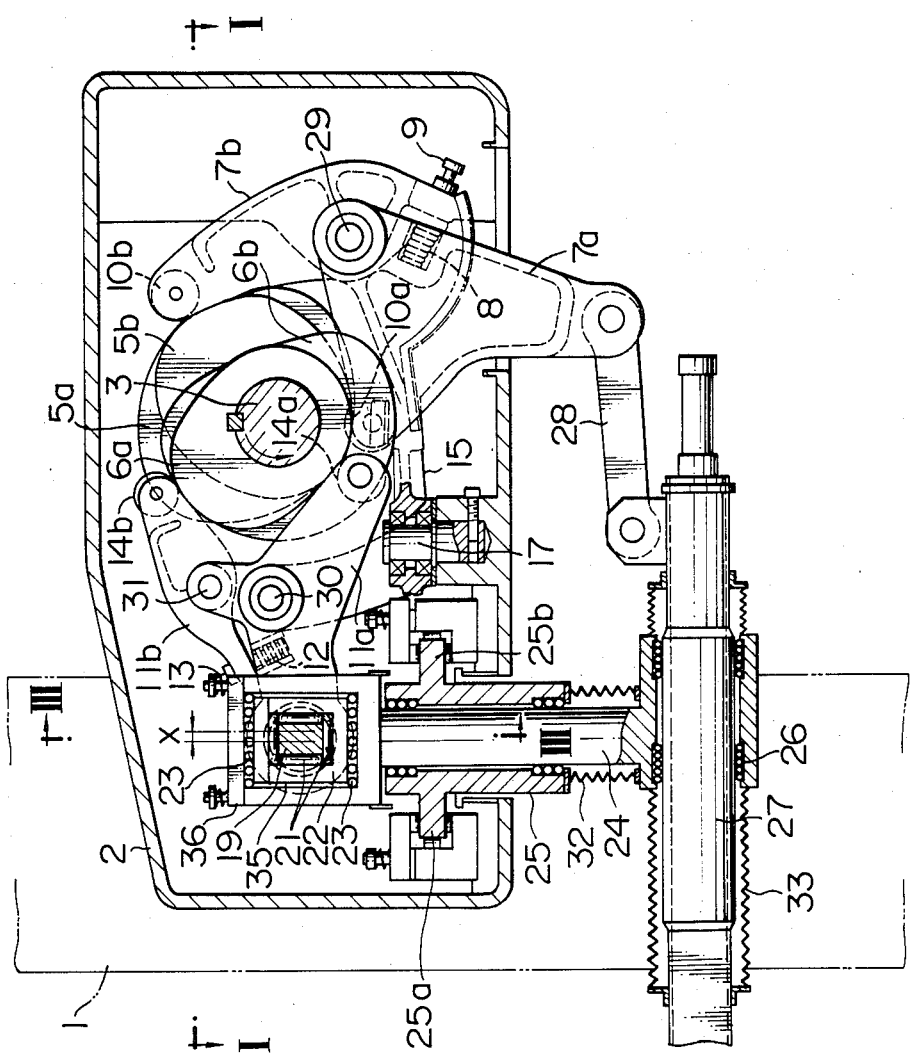
FIG. 2 is a vertical cross-sectional side view taken along a line II—II in FIG. 1.

FIG. 1 is a transverse cross-sectional plane view showing an embodiment of a mechanical transfer feeder of three-dimensional type according to the present invention whose box cover has been removed, and FIG. 2 is a vertical cross-sectional side view of the embodiment of the present invention. A feeder box 2 is fixed on a press frame 1 by bolts or the like and rotatably supported by such a feeder box 2 is one cam shaft 3 extending therethrough. A pair of positive motion end-face cams (clamp system cams) 4a, 4b are securely fixed on the cam shaft 3 within the feeder box by means of key connection etc., and at locations on the cam shaft 3 inside of these clamp system cams, two sets of advance system disc cams 5a, 5b in pair and a pair of lift system cams 6a, 6b are securely fixed on the cam shaft 3.

Figure 4:
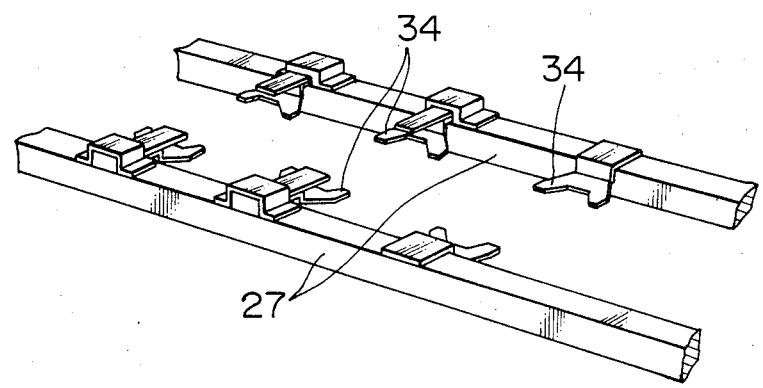
FIG. 4 is a perspective view showing a portion of feed bars.

A pair of parallel feed bars 27 are disposed below and adjacent to the either sides of the feeder box 2. A plurality of holding jaws 34 (FIG. 4) each of which are opposed with each other are mounted in spaced relation on the respective feed bars 27 in such a manner that some articles to be transferred are clamped, lifted or advanced by those holding jaws simultaneously. As shown in FIG. 2, each feed bar 27 is carried axially movably on the lower portion of a lift guide 24 through a thrust bearing 26, while the rear end 27a of feed bar is connected via a link 28 to one of advance levers 7a, 7b, i.e. the advance lever 7a. A pair of the advance levers 7a, 7b are supported by bearings on the feed box 2 to press-contact with the advance system disc cams 5a, 5b. The advance levers 7a, 7b are provided at one ends with rollers 10a, 10b respectively, which rollers press-contact with the advance system disc cams 5a, 5b under spring pressure exerted from coned disc springs 8 disposed between both levers 7a, 7b. The reference numeral 9 shows a adjusting screw for adjusting the spring pressure of coned disc spring 8, and 29 shows a fulcrum pin for supporting the advance levers 7a, 7b. Each advance lever can thus be swinged around the center of the fulcrum pin 29 by the cam action with the rotation of cam shaft 3.

Figure 3:
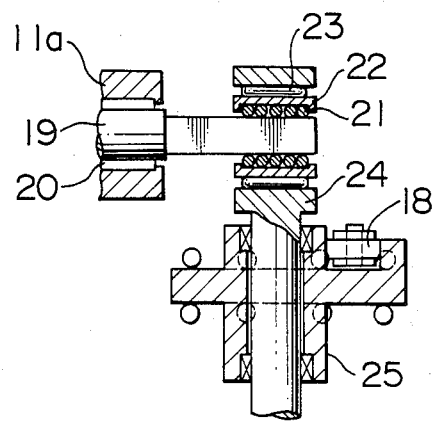
FIG. 3 shows an enlarged cross-sectional view of a substantial part taken along a line III—III in FIG. 2.

The lift guide 24 is received in a hollow lift guide carrier 25 (a clamping operation member), and a rectangular bearing box 36 attached on the upper end of the lift guide 24 includes a rectangular shaped aperture by which each end of the rod 19 extending parallel to the cam shaft 3 is held through bearings and a slider which will be described hereinafter. FIG. 3 is a vertical cross-sectional front view taken substantially along a line III—III in FIG. 2. Referring to FIGS. 1 and 3, it is understood that the rod 19 is inserted through bearings 20 into one end of a lift lever 11a which is one of a pair of lift levers 11a, 11b. The lift levers 11a, 11b are supported by bearings on the feed box 2 so as to press-contact with the lift system cams 6a, 6b. Both axial ends of the rods 19 are formed to have a rectangular cross-section as shown in FIG. 2, and are held through slide bearings 21 by a slider 22. The slider 22 is also held within the bearing box 36 through slide bearings 23, which slide bearings 23 are located at the upper and lower sides of the slider 22 for enabling the slider 22 to move horizontally with respect to the bearing box 36 by a displacement x upon the swinging movement of lift lever 11a. Each axial end of the rod 19 has at least a length which is sufficient to allow a clamping stroke. Referring again to FIG. 2, it can be seen that the lift levers 11a, 11b each includes at one end a roller 14a or 14b similar to the case of the abovementioned advance levers, and these rollers 14a, 14b are press-contacted with the lift system disc cams 6a, 6b by the spring pressure of a coned disc spring 12 set between both of the levers 11a, 11b. The reference numeral 13 shows an adjusting screw for adjusting the spring pressure of such a coned disc spring 12, and 30, 31 show fulcrum pins for supporting the lift levers 11a, 11b respectively. Each lever can thus be swinged around the center of the fulcrum pin 30 or 31 by the cam action upon the rotation of cam shaft 3. The central portion other than axial ends of the above-described rod 19 is formed in circular cross-section. The rod is arranged to be axially immovable, but rotatable in the bearing 20 provided on the one end of the lift lever pin 11a.

The lift guide carrier 25 is generally of a T-shaped hollow vertical sectional form, and is supported at both T-shaped arm portions 25a, 25b thereof via rollers by the feeder box 2 to move in a direction parallel to the cam shaft 3. A clamp lever 15 is rotatably supported at its central portion via a vertical fulcrum pin 17 by the feeder box 2 and is provided at its one end with rollers 16 in engagement with the positive motion end-face cam 4a or 4b, and at its other end with a carrier engaging roller 18 which engages with a recess formed on the arm portion of the lift guide carrier 25. Dust-proof bellows coverings 32, 33 are attached around the lift guides 24 extending on the outside of the feeder box 2 and the holding sections of the feed bars 27. The connections between the link 28 and the feed bar 27 and between the link 28 and the advance lever 7a are established with spherical bearings in order to ensure smooth movement for the link. The feeder box having the structure described above serves to hold one end of each feed bar 27, the other end of the feed bar is supported in similar fashion by an additional similar feeder box whose structure eliminates only the driving mechanism of an advance system, that is, cams 5a, 5b, cam levers 7a, 7b, and links 28 from the described structure.

In operation, when the cam shaft 3 is rotated by means of a driving source (not shown) outside the feed box, the feed bars 27 axially slide through the links 28 by the operation of the advance system disc cams 5a, 5b and the advance levers 7a, while being held by the lift guides 24, to perform the advance motion. By the operation of the positive motion end-face cams 4a, 4b and the clamp levers 15 of clamp system, the carriers 25 will move as they hold the lift guides 24 in a direction parallel to the cam shaft 3, and consequently, to the rod 19, while the bearing boxes 36 on the upper ends of the lift guides 24 slide along the axial ends of the rod 19 together with the slide bearings 21, 23 and the sliders 22. At that time the lift guides 24 laterally move in company with the feed bars 27, during which the links 28 connecting the feed bars 27 to the advance levers 7a slant to pull the advance levers 7a for making them to rotate in a clockwise direction. The advance system disc cams 5a, 5b are formed with cam action surfaces allowing these advance levers 7a to rotate in such a clockwise direction. The cam action surfaces permit the advance levers 7a to rotate at a predetermined extend so that the connecting points between the advance levers 7a and the links 28 are displaced longitudinally of the feed bars 27 to rectify them upon clamping and lifting motions. Further the configurations of the positive motion end-face cams 4a, 4b are so selectively defined that a pair of the feed bars 27 at both sides of the feed box slide in either directions close to or away from each other for carrying out the clamping and unclamping operations for the work-piece.

In response to the operations of the lift system disc cams 6a, 6b and the lift levers 11a, 11b during the rotation of cam shaft 3, the rod 19 carried by the lever 11a swings up and down around the fulcrum pin 30 of the lever 11a. Depending on the up-down movement of the rod 19, the sliders 22 at the ends of the rod may slightly horizontally move (displacement x) with respect to the lift guides 24. In this manner the horizontal displacement of the swinging rod 19 is absorbed, when the lift guides 24 slide up and down within the carriers 25 to transact the lift motions of feed bars 27. In order to facilitate the abovementioned displacement of x, a gap 35 is formed, as shown in FIG. 2, between the slider 22 and the bearing box 36.

According to the present invention, as has been previously described, since all of the cams for conducting respectively clamping, lifting or advancing motion are mounted on a common cam shaft and such a cam shaft is directly driven by one driving source, whereby the whole mechanism of the apparatus can be simplified. Because any optional operation may be accomplished by providing multiple pairs of cams and the cam displacements are not transmitted to an operating shaft through torsion members, such as gears or screws, the structure of the apparatus may be also simplified and the rigidity for that particular systems is further improved. With regard to the weight of the respective operation systems, the feed bars only occupy the whole weight of advance system, in the lift system the total weight of lift guides, bearing box 36 and sliders 22 are added to the weight of feed bars, and in the clamp system the weight of carriers 25 is also added to the weight of lift system, and accordingly, the operating sections can be conspicuously reduced in weight relative to the conventional structure. It can thus be realized that the play between the connections are reduced by making the the number of elements minimized, and that all wearing portion has been eliminated.

We claim:

1. A mechanical transfer feeder comprising a pair of substantially parallel feed bars, at least one pair of opposed jaws, one of said pair of opposed jaws being provided on each feed bar of said pair of feed bars, a mechanism incorporated in a feeder box disposed above said bars for moving said bars in three directions, each direction being substantially perpendicular to the other two directions, for effecting cyclic movement of said bars such that each pair of said opposed jaws act to clamp, lift, advance, lower and unclamp an article and return to the original position, thereby successively transferring articles from a first position to a second position, said mechanism including a cam shaft rotatably supported in said feeder box and carrying a pair of first cams, a pair of second cams and a pair of third cams, a pair of first cam leavers each having at its one end a cam follower cooperating with one of said first cams and said first cam levers carrying at their other end a rod in parallel with said cam shaft, a pair of bearing members fitted around the opposite ends of said rod and movable axially of said rod, a pair of lift guides, one of said pair of lift guides being connected at its upper end to one bearing member of said pair of bearing members and the other of said pair of lift guides being connected at its upper end to the other bearing member of said pair of bearing members, each lift guide of said pair of lift guides carrying at its lower end bearing means for slidably supporting one feed bar of a pair of feed bars, a pair of lift guide carriers each slidably supported in said feeder box to move in a direction parallel with said cam shaft each lift guide carrier of said pair of lift guide carriers supporting one lift guide of said pair of lift guides for vertically slidable movement of said lift guide in said lift guide carriers, a pair of second cam levers each operating one lift guide carrier of said pair of lift guide carriers in response to operation of the second cam, a pair of third cam levers each having at its one end a cam follower cooperating with one third cam of said pair of third cams and being connected at its other end to one feed bar of said pair of feed bars through a link.

2. A mechanical transfer feeder according to claim 1, wherein said rod is formed at its both end portions in rectangular cross section and said bearing member comprises a rectangular slider axially slidably fitted around each said end portion of said rod and a rectangular bearing box connected to the upper end of said lift guide and surrounding said slider with spaces from side surfaces of said slider so as to be laterally slidable with respect to said slider.

* * * * *